United States Patent

[11] 3,603,883

[72] Inventor Francis L. Burnham
Silver Spring, Md.

[21] Appl. No. 716,770
[22] Filed Mar. 28, 1968
[45] Patented Sept. 7, 1971
[73] Assignee The Bunker-Ramo Corporation
Canoga Park, Calif.

[54] PULSE SEPARATION CIRCUIT
9 Claims, 2 Drawing Figs.

[52] U.S. Cl. .......... 325/324
[51] Int. Cl. .......... H04b 1/10
[50] Field of Search .......... 325/404, 408, 452, 323, 324; 328/138; 174/15 BW

[56] References Cited

UNITED STATES PATENTS

| | | | |
|---|---|---|---|
| 3,077,601 | 2/1963 | Newhouse .......... | 325/452 |
| 3,218,556 | 11/1965 | Chisholm .......... | 325/324 |
| 3,456,195 | 7/1969 | Fulton, Jr. .......... | 179/15 BW |

OTHER REFERENCES

Pulse, Digital & Switching Waveforms by Millman & Taub 1965 pg. 392

*Primary Examiner*—Robert L. Griffin
*Assistant Examiner*—Anthony H. Handal
*Attorney*—Frederick M. Arbuckle

ABSTRACT: A circuit for separating pulses received on a selected carrier frequency from an environment containing pulses on a plurality of different carrier frequencies which circuit includes a first circuit for generating an output value, such as a voltage level, which is proportional to the frequency of the received input, a second circuit for comparing the output from the first circuit with a value proportional to the selected carrier frequency, and gating means which is operative in response to a match in the comparing circuit for selecting and passing received pulses. Means may be provided for indicating a bandwidth around the selected carrier frequency in which pulses are to be selected and means for permitting the gating means to pass pulses received on carriers within the bandwidth.

INVENTOR.
FRANCIS L. BURNHAM
BY
Ronald J. Kransdorf
ATTORNEY

PULSE SEPARATION CIRCUIT

PULSE SEPARATION CIRCUIT

This invention relates to a circuit for separating pulses which are received on a plurality of different carrier frequencies, and more particularly to a circuit for selecting, from an environment containing pulses on a plurality of different carrier frequencies differing by small amounts from each other, only pulses which are received on a selected carrier frequency.

Where pulse information, such as telegraphic or pulsed radar signals, are being received on a carrier waveform, a situation may arise, particularly in a crowded electromagnetic environment, where the frequency difference between the various carriers is relatively small. In this situation, the receiver must be provided with circuitry which is capable of separating the pulses which are received from one source at a given carrier frequency from those received from another source at a slightly different carrier frequency. The standard solution to this problem is to pass the signal through a tuned band-pass filter which is set for the desired frequency.

This solution is adequate for separation of continuous, or nonpulse carriers. If the receiving system, however, is required to receive narrow pulse carrier signals, it is a requirement that the band-pass filter bandwidth be greater than approximately twice the reciprocal of the desired signal pulse width. Additionally, if it is required to perform measurements such as rise and/or fall time on the received pulse signals, the band-pass filter bandwidth must materially exceed the minimum bandwidth of twice the reciprocal of the pulse width. For example, a band-pass filter operating with a center pass frequency of 100 MHz and designed to separate pulse carrier signals of 0.1 microseconds time duration with less than 10 percent duration of the pulse leading and trailing edge, would require a bandwidth in the region of 20 to 40 MHz. This requirement of sufficient bandwidth to preserve pulse shape fidelity will allow the filter to pass pulses on one or more carriers at slightly different frequencies in addition to the pulses at the desired carrier frequency.

From the above it is apparent that a technique for separating pulses on the basis of carrier frequency which does not utilize classical filtering techniques is required. This technique should provide very high frequency selectivity, approaching zero bandwidth, but since there may be a certain amount of frequency jitter from the signal source, or as a result of noise, the passband should be adjustable from near zero to some predetermined amount.

It is therefore a primary object of this invention to provide an improved circuit for separating pulses on the basis of carrier frequency.

A more specific object of this invention is to provide a pulse separating circuit of the type described above which does not require nor is limited by the use of filtering techniques.

Another object of this invention is to provide a pulse separating circuit which is capable of separating short pulses on carrier frequencies which differ in frequency only slightly from each other.

Still another object of this invention is to provide a pulse separating circuit which is capable of separating relatively narrow pulses which are separated by a relatively short time interval.

A still further object of this invention is to provide a pulse separating circuit which does not cause appreciable distortion in received pulses.

In accordance with these objects, this invention provides a circuit which includes a means for generating an output value or level which is proportional to the frequency of an applied input. In a preferred embodiment of the invention this means is a frequency discriminator, the output voltage from which is proportional to the received frequency. Received pulses are applied to the value generating means and the output from this means is applied as one input to a comparing means, the other input to the comparing means being a value which is proportional to a selected carrier frequency. When a match is detected between the output from the value generating means and the value proportional to the selected carrier frequency, a gating means is energized to pass the pulse then being received by the circuit to the circuit output line. The circuit may also include a means for indicating a bandwidth around the selected carrier frequency in which bandwidth received pulses will be considered to be from the same source, and means responsive to the bandwidth indicating means for permitting the gating means to pass pulses received on carrier frequencies which fall within the indicated bandwidth about the selected carrier frequency.

The foregoing and other objects, features and advantages of the invention will be apparent from the following more particular description of a preferred embodiment of the invention, as illustrated in the accompanying drawings.

GENERAL DESCRIPTION

Figure 1:
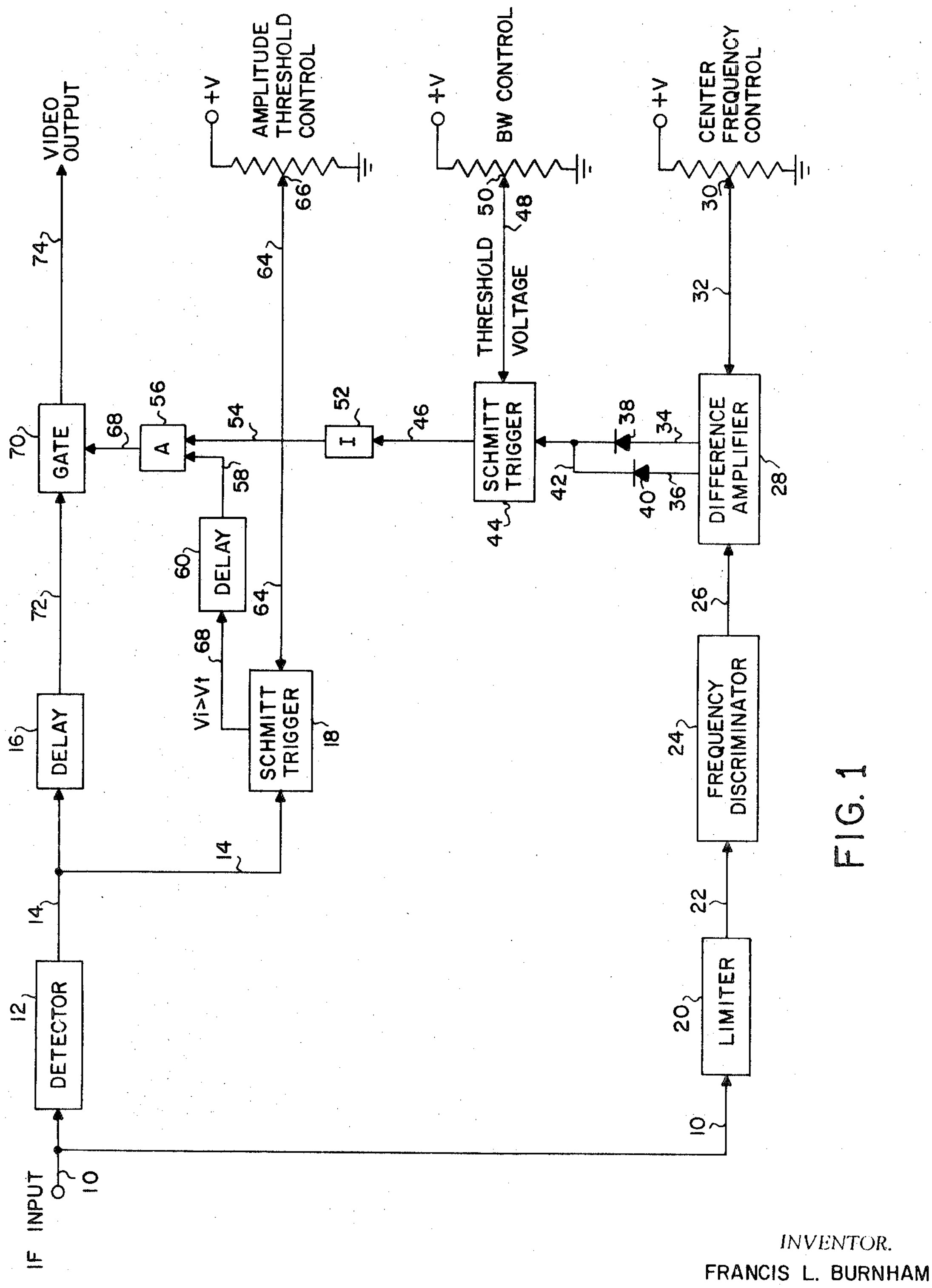
FIG. 1 is a schematic block diagram of a preferred embodiment of the invention.

Referring to FIG. 1 it is seen that the input to the circuit on line 10, which input is a number of pulse-information-carrying signals, is applied through detector 12 and line 14 to delay line 16 and as the triggering input to Schmitt trigger 18. The signal on line 10 is also applied through an amplitude limiter 20 and line 22 as an input to frequency discriminator 24. The received signals may, if necessary, be amplified or otherwise operated upon by conventional circuitry (not shown) before appearing on line 10. Detector 12 converts the bipolar IF input into a series of video-pulses on line 14 which pulses correspond to the envelopes of the IF inputs on line 10. Limiter 20 converts the IF inputs which may be at varying amplitudes to a common amplitude.

Frequency discriminator 24 is a circuit of known type which generates an output voltage, for signals in the IF band in which the circuit is designed to operate, which is a fairly linear function of the frequency of the IF signal appearing on line 22. This means that when a pulse carried on a given IF frequency appears on line 22, a pulse of like duration and of a predetermined voltage amplitude will appear on discriminator output line 26. The pulse on line 26 is applied as one input to difference amplifier 20. The other input voltage to difference amplifier 28 is derived from center-frequency-control potentiometer 30 through line 32. The setting of potentiometer 30 may be adjusted either manually or under automatic control to provide a voltage level on line 32 which is proportional to the center-frequency of the IF carrier for the pulses which it is desired to pass.

Difference amplifier 28 is a circuit of known type which has two output lines 34 and 36. The voltage on line 34 is proportional to the voltage on input line 26 minus the voltage on input line 32 while the voltage on line 36 is proportional to the voltage on input line 32 minus the voltage on input line 26. Thus, the voltage on both output lines is zero only when the input voltages on lines 26 and 32 are equal. For any other input condition, one of the output lines will have a negative voltage on it and the other a positive voltage.

The voltages on output lines 34 and 36 are passed through diode rectifiers 38 and 40 respectively, the outputs of which are combined on line 42. Diode rectifiers 38 and 40 only pass positive excursions of voltage on lines 34 and 36. Thus the voltage on line 42 is proportional to the absolute value of the difference between the two inputs to the difference amplifier. Therefore, the voltage on line 42 is positive at all times during the time interval of pulse carrier reception except when the voltage analogue of the carrier frequency at line 26 is equal to the selected center frequency voltage analogue at line 32. The level of the positive voltage at line 42 is proportional to the absolute value of the difference between the input and selected frequency.

Line 42 is connected as the triggering input to Schmitt trigger 44. Therefore, when the voltage level on line 42 exceeds a predetermined threshold voltage on line 48, Schmitt trigger 44 triggers and generates a positive voltage on output line 46. If the threshold voltage on line 48 is set for zero volts by potentiometer 50, the Schmitt trigger will trigger unless the frequency of received pulse carrier is equal to the selected frequency as set by center-frequency-control 30. If potentiometer 50 is adjusted for some finite positive voltage on line 48, the Schmitt trigger will trigger when the received carrier frequency deviates from the selected frequency by an amount sufficient to generate a greater voltage on line 42. Thus, potentiometer 50 acts as a bandwidth control to select the bandwidth or acceptance frequency band about the selected center frequency in which pulses are desired to be passed. The output of Schmitt trigger 44, which is zero volts for signals within the acceptance frequency band, and a positive voltage for signals outside this acceptance band, is applied through logic inverter 52 to line 54. Thus the signal on line 54 is a positive signal only when a pulse carrier frequency is received which is within the selected bandwidth, centered about the selected carrier frequency.

Line 54 is connected as one input to AND gate 56. The other input to AND gate 56 is output line 58 from short delay 60. The input to delay 60 is output line 62 from Schmitt trigger 18. As was indicated previously, one input to Schmitt trigger 18 is the detected video pulse on line 14. The other input to Schmitt trigger 18 is output line 64 from amplitude threshold control potentiometer 66. Thus by adjusting potentiometer 66, an amplitude threshold may be established for video pulses below which a receiver input signal will be considered to be noise rather than a signal pulse. A signal appears on line 62 when the video input voltage on line 14 is greater than the threshold voltage on line 64.

The output of AND gate 56 is a positive voltage only when the inputs on both lines 54 and 58 are positive. This occurs only when the input signal is above a selected signal strength and when this signal is within the selected acceptance frequency band. The output of AND gate 56 on line 68 is applied as a conditioning input to video-gate 70. Gate 70 will close, connecting its input on line 72 to its output on line 74, when its conditioning input on line 68 is a positive voltage.

The information input to gate 70 is output line 72 from delay line 16. As was indicated previously, the input to delay line 60 is the video input pulse on line 14. The time duration of delay line 16 is relatively short, being approximately equal to the time required by limiter 20, frequency discriminator 24, difference amplifier 28 and Schmitt trigger 44 to make a pass or no-pass decision. The delay of delay line 60 is approximately equal to the difference between the delay in delay line 16 and that in Schmitt trigger 18. Output line 74 from gate 70 is the circuit output line.

OPERATION

The operation of the circuit shown in FIG. 1 will be described with reference to the illustrative set of inputs shown on line A of FIG. 2. From the key in the lower right-hand corner of FIG. 2, it is seen that the circuit is receiving five separate input pulses which are carried on three different carrier frequencies. As will be seen later, one of these pulses may be a noise pulse and two of the different carrier frequencies may in fact be derived from the same source. Assume first that the center-frequency-control potentiometer 30 is set for a center-frequency of 100 MHz, that bandwidth-control potentiometer 50 is set to provide a 1 MHz bandwidth (i.e. 0.5 MHz on either side of the center frequency) and that threshold potentiometer 66 is set for an input threshold level as shown on line B of FIG. 2. Under these conditions, frequency discriminator 24 will have an output as shown on line C of FIG. 2.

Figure 2:
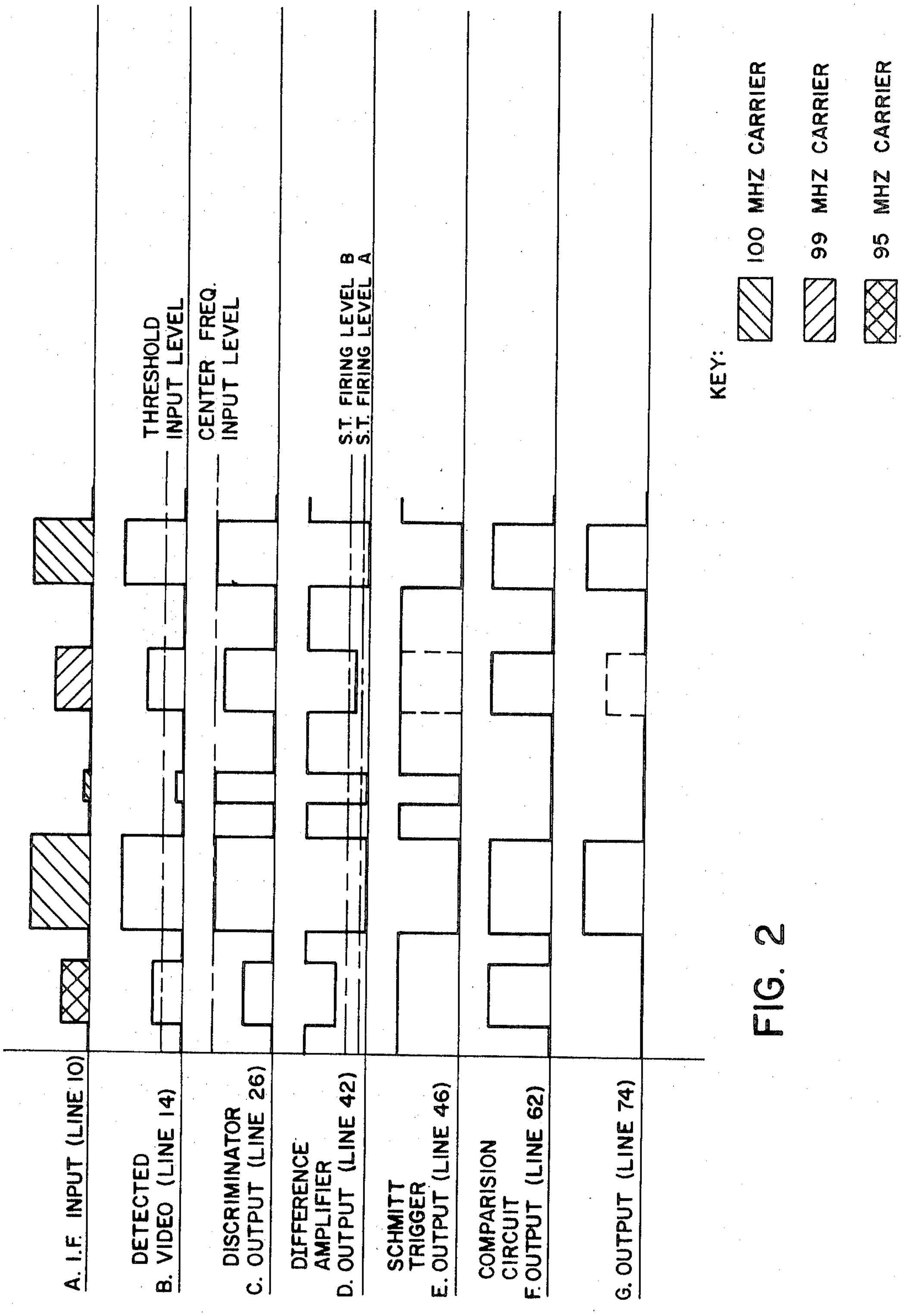
FIG. 2 is a diagram illustrating the signals appearing at various points in the circuit of FIG. 1 under illustrative operating conditions.

Since the input level on line 32 to difference amplifier 28 is set to the voltage output from the frequency discriminator for pulses received on a 100 MHz carrier, the rectified output on line 42 from difference amplifier 28 will be substantially as shown on line D of FIG. 2. From this figure it is seen that the difference amplifier has a zero output for the second, third, and fifth received pulses, the pulses received on the 100 MHz carrier, a relatively small output for the fourth pulse, the pulse received on the 99 MHz carrier, and a somewhat larger output for the first pulse, the pulse received on the 95 MHz carrier. Under the initial assumption, Schmitt trigger 44 fires when the output from the difference amplifier is greater than that caused by a 0.5 MHz difference between the selected center-frequency, 100 MHz for the example chosen, and the carrier frequency of the input pulse. Thus, for the initial setting of the circuit which has been assumed, Schmitt trigger 44 generates an output on line 46 which is as shown in solid lines on line E in FIG. 2.

From line B of FIG. 2, it is seen that all pulses but the third pulse exceed the threshold level set by potentiometer 66. Therefore, Schmitt trigger 18 generates output pulses on line 62 as shown on line F of FIG. 2. AND gate 56 generates output signals on line 68 to condition gate 70 only when a pulse appears on line 58 at the same time that there is no signal output from Schmitt trigger 44 on line 46. Referring to lines E and F of FIG. 2 it is seen that this condition occurs only for the second and fifth pulses of the input train. Thus, these are the only pulses which are passed by gate 70 to output lines 74. While the output on line G of FIG. 2 has been shown as being lined up with the input on line A, the output will in fact be delayed slightly because of the effect of delay line 16. This delay is not, however of sufficient duration to be reflected in a drawing of the scale shown in FIG. 2.

Assume now that a greater amount of jitter is anticipated on the input carrier so that a 4 rather than a 1 megacycle passband is considered acceptable. Under these conditions, bandwidth control potentiometer 50 would be set for a 2 MHz passband on either side of the selected center frequency. From line D of FIG. 2, it can be seen that with this setting, Schmitt trigger 44 would not fire for the second, the fourth, and the fifth ones of the received pulses. The output from Schmitt trigger 44 on line 46 would thus differ from that previously indicated as shown by the dotted line on line E of FIG. 2. This change in the output of Schmitt trigger 44 would permit gate 70 to be conditioned to pass the fourth pulse as well as the second and fifth. Therefore, the pulses appearing on output line 74 from the circuit would be those shown both in solid and dotted lines on line G of FIG. 2.

From the above it is apparent that a circuit has been provided which permits the selection of pulses on the basis of carrier frequency with any desired degree of bandwidth variation control down to a bandwidth variation approaching zero. Since there is no operation on the pulses, except for delaying and gating, between the input and the output, there is a minimum of distortion in the pulse shapes and, since the circuit does not utilize reactance elements as in a conventional circuit utilizing band-pass filter, the circuit has a relatively rapid response time.

While in the preferred embodiment of the invention a bandwidth control has been provided in the form of Schmitt trigger 44, bandwidth control may also be effected by other means such as by adding and subtracting a bandwidth voltage from the center frequency voltage on line 32 and using these voltages with a pair of difference amplifiers and a gating circuit to determine if the carrier for a received pulse is within the desired bandwidth. It may also be possible, with suitable modifications in other elements, to substitute any circuit with an output level or value (i.e. voltage, current, digital count, etc.) which is proportional to an input frequency for frequency discriminator 24.

While the invention has been particularly shown and described with reference to a preferred embodiment thereof, it will be apparent to those skilled in the art that the foregoing and other changes in form and details may be made therein without departing from the spirit and scope of the invention.

What is claimed is:

1. A circuit for receiving pulses on a plurality of different carrier frequencies and for passing as an output only those pulses received on a selected carried frequency comprising:

means for generating an output value which is proportional to the frequency of an applied input;

means for applying said received pulses as the input to said value generating means;

means for generating a reference value which is proportional to the frequency of said selected carrier frequency, said means being operative independent of said applied input;

means for comparing the output from said value generating means against said reference value; and gating means operative in response to a match within a predetermined threshold of said two input values in said comparing means for passing the pulse being received by the circuit to the circuit output.

2. A system of the type described in claim 1 wherein said output value generating means is a frequency discriminator, and wherein said value is a voltage level.

3. A system of the type described in claim 2 wherein said reference value is a voltage level;

wherein said comparing means is a difference amplifier, the output voltage from which varies in proportion to the difference between said reference voltage level and the voltage level output from said frequency discriminator; and wherein said gating means includes a Schmitt trigger, and means for applying the output from said difference amplifier to control the firing of said Schmitt trigger.

4. A system of the type described in claim 3 wherein said gating means includes means for adjusting the triggering level of said Schmitt trigger whereby the range of voltages applied to said Schmitt trigger which will cause the trigger to fire may be adjusted.

5. A system of the type described in claim 4 wherein said gating means includes means operative to pass a pulse to the circuit output only when said Schmitt trigger is not fired.

6. A system of the type described in claim 1 including means for determining if the amplitude of a received pulse exceeds a predetermined threshold; and wherein said gating means includes means responsive to said determining means for inhibiting the passing of a pulse to the circuit output if the amplitude of a pulse does not exceed said threshold.

7. A system of the type described in claim 1 wherein a finite period of time is required to perform the operations in said value generating, comparing, and gating means; and including means for delaying received pulses by a time equal to said finite period of time before applying them to said gating means.

8. A system of the type described in claim 1 wherein said gating means includes means for indicating a bandwidth around said selected carrier frequency, and means responsive to said bandwidth indicating means for permitting said gating means to pass pulses received on carrier frequencies which fall within said indicated bandwidth about said selected carrier frequency.

9. A method for selecting pulses carried on a selected carrier frequency from an environment containing pulses carried on a plurality of difference carrier frequencies comprising the steps of:

generating an output value which is proportional to the frequency of an applied input;

applying said received pulses as the input to said value generating means;

generating a reference value which is proportional to the frequency of said selected carrier frequency, said reference value being generated independent of said applied input;

comparing the output from said value generating means against said reference value and;

passing the pulse being received by the circuit to the circuit output in response to a match within a predetermined threshold of said two input values during said comparing step.